Jan. 26, 1926.
Re. 16,256
J. MOSCINI
PAPER MATCH MACHINE
Original Filed Dec. 19, 1918 2 Sheets-Sheet 1
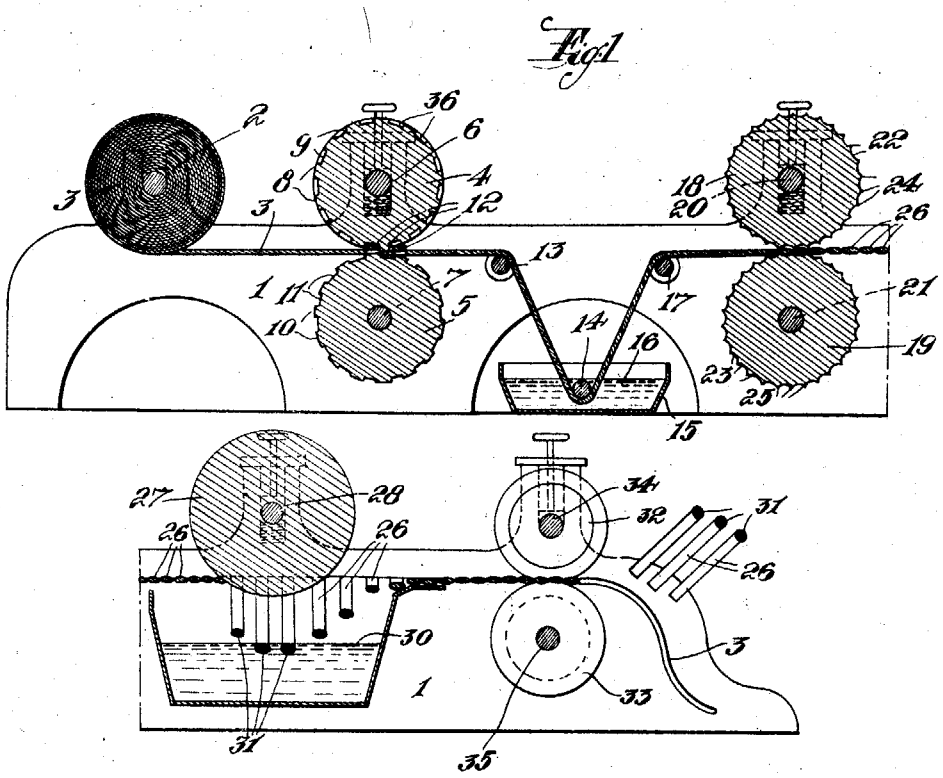
INVENTOR
John Moscini
BY
William S. Gluck
ATTORNEY Jan. 26, 1926.
Re. 16,256
J. MOSCINI
PAPER MATCH MACHINE
Original Filed Dec. 19, 1918 2 Sheets-Sheet 2
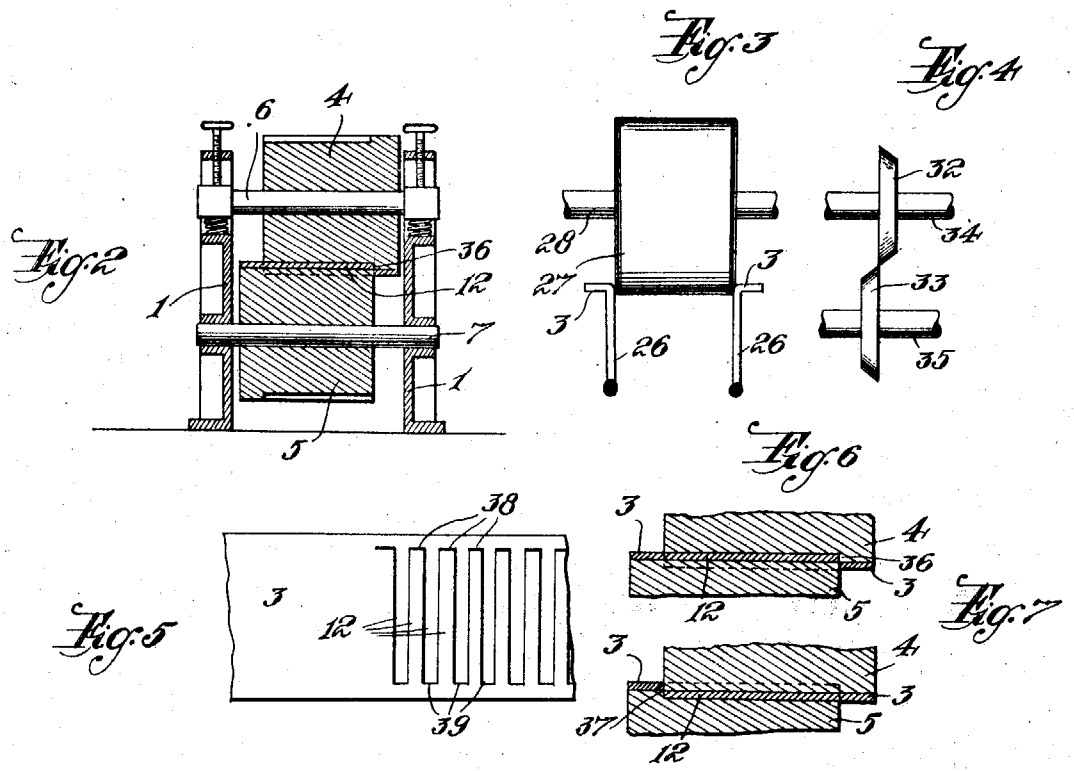
INVENTOR
John Moscini
BY
William S. Glass
ATTORNEY Reissued Jan. 26, 1926.

Re. 16,256

UNITED STATES PATENT OFFICE.

JOHN MOSCINI, OF BROOKLYN, NEW YORK, ASSIGNOR TO OVAL MATCH COMPANY, INC., OF NEW YORK, N. Y., A CORPORATION OF NEW YORK.

PAPER-MATCH MACHINE.

Original application filed December 19, 1918, Serial No. 267,476. Renewed October 7, 1919, Serial No. 329,083. Original No. 1,327,627, dated January 13, 1920. Application for reissue filed December 10, 1921. Serial No. 521,556.

*To all whom it may concern:*

Be it known that JOHN MOSCINI, a citizen of the United States, residing at Brooklyn, in the county of Kings and State of New York, have invented certain new and useful Improvements in Paper-Match Machines, of which the following is a full, clear, and exact specification.

This invention relates to machines for making matches from paper or paper board, and has for its object to provide apparatus which is simplified in construction as compared with prior machines of this nature and is capable of making a practical paper match more cheaply than heretofore.

The invention contemplates the cutting of a strip of paper board or other suitable material into transverse fingers or match splints which are left connected to one margin of the strip so that they may be carried therewith through successive operations of finishing said splints, after which they are cut from the margins as complete matches. The intermediate operations may include treating the fingers or splints with hot wax, rounding the corners thereof while they are soft from such treatment, and coating the ends with striking substance.

The invention will be first hereinafter described in connection with the accompanying drawings, which constitute part of this specification, and then more specifically defined in the claims at the end of the specification.

In the accompanying drawing, wherein similar reference characters are used to designate corresponding parts throughout the several views:—

Figure 1 is a longitudinal vertical section of a machine embodying the invention, the same being shown in two supplemental parts one below the other because it is too long to go on the sheet.

Figure 2 is a vertical section through the cutting rolls.

Figure 3 is a detailed view showing the roller for turning down the fingers or splints to dip their free ends into the striking substance.

Figure 4 is a detailed view of a pair of the cutting disks for severing the finished matches from the margins of the strip.

Figure 5 is a detailed plan view of a portion of the strip to illustrate the manner of cutting the middle portion thereof into intermeshing fingers attached to the opposite margins of the strip, and Figures 6 and 7 are detailed fragmentary views of the meeting peripheries of the cutting rolls to show how this cutting is performed.

The machine frame is indicated generally at 1 in a diagrammatic way sufficiently to illustrate the several features of the invention, obvious contributory elements being omitted for the sake of clearness. For instance, it will be understood that the several rolls and cutting disks may be connected up in any suitable manner with driving means (not shown) and the stretches of the strip between the several pairs of rolls, etc., may be suitably supported where necessary or desirable although not illustrated.

At one end of the frame 1 a roll of paper board 3 is mounted in suitable bearings 2, and said paper board is fed from the roll thereof between a pair of cutting rolls 4 and 5 mounted on shafts 6 and 7, respectively, journaled suitably farther along the frame. The cutting roll 4 has longitudinal cutting ribs 8 on its periphery alternating with grooves 9, while the roll 5 has similar cutting ribs 10 alternating with grooves 11 which correspond with the ribs and grooves on the roll 4 and are staggered therewith. The peripheries of the rolls 4 and 5 are tangent or just meet so that as the strip 3 passes between them it is cut into transverse fingers or splints 12.

The rolls 4 and 5 are arranged as illustrated in Figures 2, 6 and 7 with the grooves of each terminating at a distance from one margin of the strip and the ends of the ribs cooperating with the ends of the grooves, as at 36, to cut alternate fingers or splints from each margin of the strip but leave the others connected thereto, as shown also in Figure 5. Owing to the fact that the fingers are retained in connection with the margins of the strip, they may be fed along as an integral strip through the succeeding operations.

After leaving the cutting rolls, the strip with the partially severed fingers or splints 12 passes over a guide roller 13 and then down into a pan or receptacle 15 containing hot wax 16. The strip is submerged in the hot wax by passing below a guide roller 14 in the pan, and from said roller the strip passes upward again and over another guide roller 17, after which it passes between a pair of shaping rolls 18 and 19 which are mounted on shafts 20 and 21, respectively, suitably journaled in the frame 1. The peripheries of these rolls are fluted and tangent to one another. The roll 18 has rounded grooves 22 separated by V-shaped edges 24, while the roll 19 has similar grooves 23 separated by correspondingly shaped edges 25, which register with the edges 24 on the roll 18. The shaping rolls serve to round the corners of the fingers or splints so that they will conform to the usual shape of the ordinary match, as indicated at 26. It will be observed that as the splints pass between the shaping rolls immediately after coming from the bath of hot wax, they are soft and can be easily shaped as described.

The strip next passes over a pan or receptacle 29 in which the liquid striking substance 30 is contained, and the fingers or splints 26 are turned down to dip their free ends into said substance by means of a roll 27 which is mounted on an axle or shaft 28 suitably journaled in the frame of the machine. Said roll 27 extends below the path of the strip over the pan 29, as illustrated in Figures 1 and 3, and is of less width than the length of the fingers or splints, so that it successively depresses them until their free ends dip into the striking substance. After passing from below the roll 27, the splints or fingers rise again to the plane of the margins of the strip, and are finally fed between pairs of cutting disks 32 and 33 which are mounted on shafts 34 and 35, respectively, suitably journaled in the frame 1. These cutting disks, of which it will be understood there are two pairs, one in line with the connected ends of the fingers or splints on each margin of the strip, serve to sever said splints or fingers from the margins and discharge the same as completed individual matches 26 with striking caps 31 at the discharge end of the machine.

Having thus described my invention, what I claim as new and desire to secure by Letters Patent of the United States:—

1. In a machine of the character described, the combination with means for cutting a strip of material into transversely arranged intermeshing fingers alternate ones of which are joined to opposite uncut margins of the strip, of means for bending down the free end of said fingers for receiving coatings of striking substance while the uncut margins of the strip travel in a horizontal plane, and means for finally cutting said fingers from the margins of the strip to produce finished individual matches.

2. In a machine of the character described, the combination with means for cutting a strip of material into transversely arranged fingers connected to one margin of said strip, of means for bending down said fingers while the uncut margin of the strip to which they are connected travels in a horizontal plane for coating the free ends of the fingers with striking substance.

3. In a machine of the character described, the combination with means for cutting a strip of material into transversely arranged fingers connected to one margin of the strip, of means for passing said strip and fingers through a bath of hot wax, a pair of shaping rollers between which said fingers are passed for rounding the corners thereof immediately after coming from the hot wax bath, means for coating the free ends of the fingers with striking substance, and means for cutting the fingers from the margin of the strip.

4. In a machine of the character described, the combination with means for cutting a strip of material into transversely arranged fingers connected to one margin of the strip, of means for passing said fingers through a bath of hot wax, means for shaping said fingers with rounded corners immediately after coming from the hot wax bath, means for turning down said fingers along the line of their connections to the margins for coating their free ends with striking substance, and means for finally cutting said fingers from the margin of the strip.

5. In a machine of the character described, a pair of cutting rolls arranged one above the other and having staggered axially extending cutting ribs alternating with similarly arranged grooves corresponding to the ribs on the opposite roll, and means for passing a strip of material between said rolls for cutting the same transversely into match splints, the peripheries of said rolls determined by the outer faces of the ribs being arranged to meet for the purpose specified.

6. In a machine of the character described, the combination with means for cutting a strip of material transversely into fingers connected to one margin of the strip, of a receptacle for liquid striking substance, means for passing said strip and fingers over said receptacle, and a roll extending below the path of said strip over the receptacle and adapted to turn down said fingers to dip their free ends into said striking substance.

7. In a machine of the character described, the combination with means for cutting a strip of material transversely into fingers alternately connected to opposite margins of the strip, of a receptacle to contain liquid striking substance, means for passing said strip and fingers over said receptacle, and a roll extending below the path of the margins of the strip and of less width than said fingers for turning down the latter simultaneously from both margins to dip their free ends into the striking substance.

8. In a machine of the character described, the combination with means for cutting a strip of material into transversely arranged intermeshing fingers alternate ones of which are joined to opposite uncut margins of the strip, of ignition material supplying means and means for bending the free end of said fingers for receiving coatings of ignition material while the uncut margins of the strip travel in a horizontal plane past the ignition supplying means.

9. In a machine of the character described, the combination with means for cutting a strip of material into transversely arranged fingers connected to one margin of said strip, of ignition material supplying means and means for bending said fingers while the uncut margin of the strip to which they are connected travels along for coating the free ends of the fingers with ignition material while the strip is fed past the ignition material supplying means.

10. In a machine of the character described, the combination with means for cutting a strip of material into transversely arranged fingers connected to one margin of the strip, of means for passing said strip and fingers through a bath of hot wax, and a pair of shaping rollers between which said fingers are passed for rounding the corners thereof immediately after coming from the hot wax bath.

11. In a machine of the character described, the combination with means for cutting a strip of material into transversely arranged fingers connected to one margin of the strip, of means for passing said strip and fingers through a bath of hot wax, and a pair of shaping members between which said fingers are passed.

12. In a machine of the character described, the combination with means for forming from the strip of material a continuous margin with compressively shaped fingers projecting from one edge thereof, of means for treating said fingers with a material before compressively shaping the fingers, whereby the fingers are softened prior to the shaping operation, and are then stiffened.

13. In the art of forming matches in strip form from a sheet of material the step or steps of so treating a sheet as to produce a strip of match splints having the body portions shaped and compressed, said splints being secured together in strip form with the splints impregnated with a stiffening filler.

14. In the art of forming matches in strip form from a strip of material the steps of first so treating the strip before compressively shaping the matches that the material will be first softened for shaping and the compressively shaped matches will thereafter be stiffened to give them rigidity.

15. In the art of forming matches in strip form from a sheet of material, the step or steps of so treating a sheet as to produce a strip of connected molded and stiffened matches.

16. The process of forming a strip of connected matches from a single sheet of material which includes paraffining the sheet and then so treating it as to sever all but a narrow portion at one or both edges of the sheet into separate match bodies, and shaping such bodies by pressure while leaving them connected at one end to one such narrow strip at one edge of the strip.

In testimony whereof, I have hereunder signed my name.

JOHN MOSCINI.